(12) United States Patent
Kim et al.

(10) Patent No.: US 12,411,267 B2
(45) Date of Patent: Sep. 9, 2025

(54) OPTICAL MULTILAYER STRUCTURE AND METHOD FOR MANUFACTURING THE SAME

(71) Applicant: SK Innovation Co., Ltd., Seoul (KR)

(72) Inventors: Chun Ho Kim, Daejeon (KR); Cheol Min Yun, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 197 days.

(21) Appl. No.: 18/220,473

(22) Filed: Jul. 11, 2023

(65) Prior Publication Data
US 2024/0027653 A1  Jan. 25, 2024

(30) Foreign Application Priority Data
Jul. 12, 2022  (KR) .......................... 10-2022-0085413

(51) Int. Cl.
| | |
|---|---|
| G02B 1/14 | (2015.01) |
| B32B 7/10 | (2006.01) |
| B32B 17/10 | (2006.01) |
| B32B 27/28 | (2006.01) |
| C08G 73/10 | (2006.01) |
| C09D 179/08 | (2006.01) |

(52) U.S. Cl.
CPC .................. *G02B 1/14* (2015.01); *B32B 7/10* (2013.01); *B32B 17/10* (2013.01); *B32B 27/281* (2013.01); *C08G 73/1039* (2013.01); *C08G 73/1042* (2013.01); *C08G 73/106* (2013.01); *C09D 179/08* (2013.01); *B32B 2250/03* (2013.01); *B32B 2457/20* (2013.01)

(58) Field of Classification Search
CPC .. G02B 1/14; B32B 7/10; B32B 17/10; B32B 27/281; B32B 2250/03; B32B 2457/20; C08G 73/1039; C08G 73/1042; C08G 73/106; C08G 77/455; C08G 73/16; C09D 179/08; C09D 183/10
See application file for complete search history.

(56) References Cited

U.S. PATENT DOCUMENTS

| | | |
|---|---|---|
| 6,815,070 B1 | 11/2004 | Burkle et al. |
| 7,410,686 B2 | 8/2008 | Osada et al. |
| 10,688,756 B2 | 6/2020 | Chu et al. |
| 10,964,898 B2 | 3/2021 | Seki et al. |

(Continued)

FOREIGN PATENT DOCUMENTS

| | | |
|---|---|---|
| JP | 2006182854 A | 7/2006 |
| JP | 201637048 A | 3/2016 |

(Continued)

*Primary Examiner* — John D Freeman
(74) *Attorney, Agent, or Firm* — The Webb Law Firm

(57) ABSTRACT

Provided is an optical multilayer structure including a shatterproof layer including a polyimide resin including a siloxane structure and an adhesion promoting layer. Since the adhesion promoting layer and the shatterproof layer of the optical multilayer structure according to one implementation are connected by a chemical bond (imide bond), interlayer adhesiveness is high and durability is excellent. In addition, the optical multilayer structure according to one implementation has excellent heat resistance, so that curling is reduced to minimize substrate bending, has high surface hardness, so that mechanical properties are excellent, and has a low haze and is transparent, so that optical properties are excellent.

20 Claims, 3 Drawing Sheets

(56) References Cited

U.S. PATENT DOCUMENTS

| | | |
|---|---|---|
| 11,161,323 B2 | 11/2021 | Choi et al. |
| 2012/0196103 A1 | 8/2012 | Murashige et al. |
| 2013/0186548 A1 | 7/2013 | Takao et al. |
| 2015/0002760 A1 | 1/2015 | Morimoto et al. |
| 2015/0072125 A1 | 3/2015 | Murashige et al. |
| 2016/0002103 A1 | 1/2016 | Wang et al. |
| 2016/0075110 A1 | 3/2016 | Kakuta et al. |
| 2017/0298249 A1* | 10/2017 | Lin ................ C08G 73/106 |
| 2018/0034001 A1 | 2/2018 | Hwang et al. |
| 2020/0040152 A1* | 2/2020 | Yun .................... B32B 38/00 |
| 2020/0133342 A1 | 4/2020 | Choi et al. |
| 2020/0147945 A1* | 5/2020 | Kourtakis ........... B32B 27/281 |
| 2020/0174161 A1 | 6/2020 | Ahn et al. |
| 2020/0198302 A1 | 6/2020 | Murashige et al. |
| 2020/0292731 A1 | 9/2020 | Park et al. |
| 2020/0342789 A1 | 10/2020 | Park et al. |
| 2021/0002947 A1 | 1/2021 | Park et al. |
| 2021/0096280 A1 | 4/2021 | Kim et al. |
| 2021/0403769 A1 | 12/2021 | Kiyoto |

FOREIGN PATENT DOCUMENTS

| | | |
|---|---|---|
| JP | 6350163 B2 | 7/2018 |
| JP | 2019504812 A | 2/2019 |
| JP | 2019119779 A | 7/2019 |
| JP | 202020960 A | 2/2020 |
| KR | 100489727 B1 | 5/2005 |
| KR | 1020050106538 A | 11/2005 |
| KR | 100884917 B1 | 2/2009 |
| KR | 1020120016906 A | 2/2012 |
| KR | 101238214 B1 | 3/2013 |
| KR | 1020130084102 A | 7/2013 |
| KR | 1020130117464 A | 10/2013 |
| KR | 1020150037381 A | 4/2015 |
| KR | 1020160014614 A | 2/2016 |
| KR | 1020160117867 A | 10/2016 |
| KR | 101787941 B1 | 10/2017 |
| KR | 1020170113815 A | 10/2017 |
| KR | 1020180012913 A | 2/2018 |
| KR | 101835933 B1 | 3/2018 |
| KR | 1020180039219 A | 4/2018 |
| KR | 1020190018114 A | 2/2019 |
| KR | 1020190059010 A | 5/2019 |
| KR | 101993652 B1 | 9/2019 |
| KR | 102068685 B1 | 1/2020 |
| KR | 102068729 B1 | 1/2020 |
| KR | 1020200005672 A | 1/2020 |
| KR | 1020200016797 A | 2/2020 |
| KR | 102102688 B1 | 4/2020 |
| KR | 1020200040137 A | 4/2020 |
| KR | 1020200049942 A | 5/2020 |
| KR | 102147297 B1 | 8/2020 |
| KR | 1020200098382 A | 8/2020 |
| WO | 2017221776 A1 | 12/2017 |

* cited by examiner

OPTICAL MULTILAYER STRUCTURE AND METHOD FOR MANUFACTURING THE SAME

CROSS-REFERENCE TO RELATED APPLICATION

This application claims priority to Korean Patent Application No. 10-2022-0085413 filed Jul. 12, 2022, the disclosure of which is hereby incorporated by reference in its entirety.

BACKGROUND OF THE INVENTION

Field of the Invention

The following disclosure relates to an optical multilayer structure and a method for manufacturing the same.

Description of Related Art

A polyimide film is a material for a substrate, a cover window, and the like of a display device, and is attracting attention as a next-generation material which may replace tempered glass. In order to apply a film to a display device, it is important to improve intrinsic yellow index characteristics and impart colorless and transparent characteristics. Furthermore, in order to make the film applicable to a foldable or flexible display device, mechanical properties should be also improved, and thus, the required performance of the polyimide film for a display device is gradually increased.

In particular, it is important to design a flexible display device which may be bent or folded when the user wants as a flexible structure so that the device is not easily broken upon external impact or during a bending or folding process.

SUMMARY OF THE INVENTION

An embodiment of the present disclosure is directed to providing an optical multilayer structure which has excellent durability and/or optical properties while having reduced thermal expansion-shrinkage behavior, and/or has increased surface hardness.

Another embodiment of the present disclosure is directed to providing a method for manufacturing the optical multilayer structure.

Still other embodiments of the present disclosure are directed to providing a window cover film comprising the optical multilayer structure and a flexible display panel comprising the window cover film.

In one general aspect, an optical multilayer structure comprises:
 a substrate;
 an adhesion promoting layer which is formed on any one or both surfaces of the substrate, the adhesion promoting layer being prepared from a composition comprising a polyimide resin; and
 a shatterproof layer which is formed on the adhesion promoting layer, the shatterproof layer being prepared from a composition comprising a polyimide resin comprising a structural unit represented by the following Chemical Formula 1,
wherein the adhesion promoting layer and the shatterproof layer provide an optical multilayer structure connected by an imide bond,

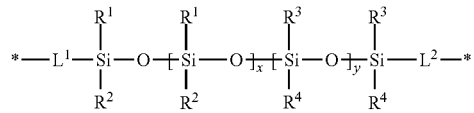

[Chemical Formula 1]

wherein
R$^1$ and R$^2$ are independently of each other C$_{1-5}$ alkyl which is unsubstituted or substituted with one or more halogens;
R$^3$ and R$^4$ are independently of each other C$_{6-10}$ aryl which is unsubstituted or substituted with one or more halogens;
L$^1$ and L$^2$ are independently of each other C$_{1-10}$ alkylene; and
x and y are independently of each other an integer of 1 or more.

In another general aspect, a method for manufacturing an optical multilayer structure comprises:
 applying a polyimide precursor composition on any one or both surfaces of a substrate and drying the composition to form an adhesion promoting layer; and
 applying a polyimide precursor composition comprising a structural unit represented by Chemical Formula 1 and curing the composition to form a shatterproof layer.

In another general aspect, a window cover film comprises the optical multilayer structure disclosed herein.

In still another general aspect, a flexible display panel comprises the window cover film disclosed herein.

Other features and aspects will be apparent from the following detailed description, the drawings, and the claims.

DETAILED DESCRIPTION OF MAIN ELEMENTS

Figure 1:
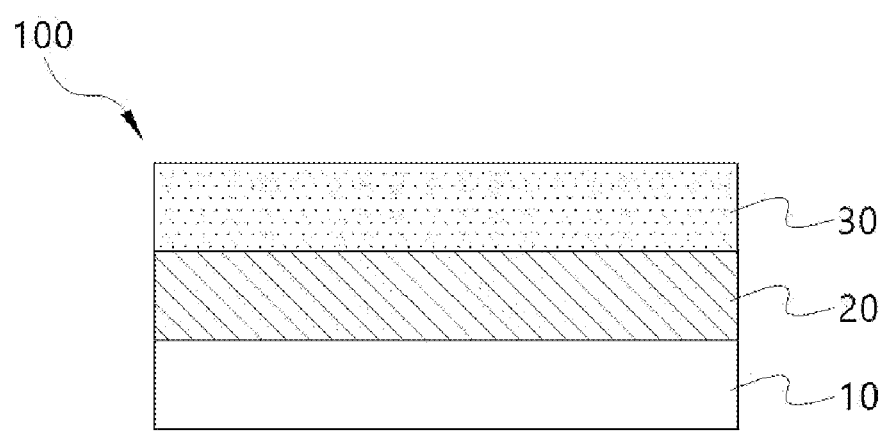
FIG. 1 schematically shows a structure of an optical multilayer structure according to one implementation, in which an adhesion promoting layer 20 and a shatterproof layer 30 are laminated on a single surface of a substrate 10.

100: Optical multilayer structure
10: Substrate

20: Adhesion promoting layer
30: Shatterproof layer
40: Hard coating layer

DESCRIPTION OF THE INVENTION

The embodiments described in the present specification may be modified in many different forms, and the technology according to one embodiment is not limited to the embodiments set forth herein. Furthermore, throughout the specification, unless explicitly described to the contrary, "comprising", "including" or "containing" any constituent elements will be understood to imply further inclusion of other constituent elements.

Unless the context clearly indicates otherwise, the singular forms of the terms used in the present specification may be interpreted as including the plural forms. As used herein, the singular form of "a", "an", and "the" include plural referents unless the context clearly states otherwise.

For the purposes of this specification, unless otherwise indicated, all numbers expressing quantities of ingredients, reaction conditions, dimensions, physical characteristics, and so forth used in the specification and claims are to be understood as being modified in all instances by the term "about." Hereinafter, unless otherwise defined herein, "about" may be considered as a value within 30%, 25%, 20%, 15%, 10%, 5%, 3%, 2%, 1%, 0.5%, 0.1%, 0.05% or 0.01 of the specified value. Unless indicated to the contrary, the numerical parameters set forth in the following specification and attached claims are approximations that can vary depending upon the desired properties sought to be obtained by the present invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

Numerical ranges used in the present specification comprise all values within the range comprising the lower limit and the upper limit, increments logically derived in a form and spanning in a defined range, all double limited values, and all possible combinations of the upper limit and the lower limit in the numerical range defined in different forms. As an example, when it is defined that a content of a composition is 10% to 80% or 20% to 50%, it should be interpreted that a numerical range of 10% to 50% or 50% to 80% is also described in the specification of the present. Unless otherwise defined in the present specification, values which may be outside a numerical range due to experimental error or rounding off of a value are also comprised in the defined numerical range.

Hereinafter, unless otherwise defined in the present specification, a "mixture(s) thereof" or "combination(s) thereof" refers to mixing or copolymerization of constituents.

Hereinafter, unless otherwise defined in the present specification, the term "A and/or B" in the present specification may refer to an embodiment comprising both A and B or an embodiment selecting one of A or B.

Hereinafter, unless otherwise defined in the present specification, a "polymer" may comprise an oligomer or a polymer, and may comprise a homopolymer or a copolymer. The copolymer may comprise a random copolymer, a block copolymer, a graft copolymer, an alternating copolymer, a gradient copolymer, or all of the above-mentioned polymers.

Hereinafter, unless otherwise defined in the present specification, a "polyamic acid" may refer to a polymer comprising a structural unit comprising an amic acid moiety, and a "polyimide" may refer to a polymer comprising a structural unit comprising an imide moiety.

Hereinafter, unless otherwise defined in the present specification, a polyimide film may be a film comprising a polyimide, or may be a high thermal resistant film manufactured by performing solution polymerization of an acid anhydride compound in a diamine compound solution to prepare a polyamic acid, and performing imidization.

Hereinafter, unless otherwise defined in the present specification, it will be understood that when an element such as a layer, a film, a thin film, a region, or a substrate is referred to as being "on" or "above" another element, it may be "directly on" the other element or intervening element(s) may also be present therebetween.

Hereinafter, unless otherwise defined in the present specification, "substituted" refers to a hydrogen atom in a compound being substituted with a substituent. For example, the substituent may be selected from deuterium, halogen atoms (F, Br, Cl, or I), a hydroxyl group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a $C_{1-30}$ alkyl group, a $C_{2-30}$ alkenyl group, a $C_{2-30}$ alkynyl group, a $C_{6-30}$ aryl group, a $C_{7-30}$ arylalkyl group, a $C_{1-30}$ alkoxy group, a $C_{1-20}$ heteroalkyl group, a $C_{3-20}$ heteroarylalkyl group, a $C_{3-30}$ cycloalkyl group, a $C_{3-15}$ cycloalkenyl group, a $C_{6-15}$ cycloalkynyl group, a $C_{2-30}$ heterocyclic group, and/or a combination thereof.

Hereinafter, otherwise defined in the present specification, "(meth)acryl" may be used in a meaning comprising "methacryl and/or "acryl".

Hereinafter, unless otherwise defined in the present specification, a "(meth)acryl-based crosslinked polymer" may refer to a crosslinked polymer formed by crosslinking (meth)acryl-based compounds comprising a (meth)acryl group to each other, and the (meth)acryl-based crosslinked polymer may or may not comprise a (meth)acryl group, for example, a (meth)acrylate group.

Hereinafter, unless otherwise particularly defined, the term "flexible" means that a flexible constituent may be warped, bent, and/or folded.

An ultrathin glass (UTG) is a tempered glass material component used in a display cover window, and a method of coating a polyimide film for scattering resistant coating on UTG is known, but a problem of film curling in a drying step due to a difference in a thermal expansion coefficient between UTG and a polyimide film was not solved. Meanwhile, a conventional material for improving curling has partially improved curling by introducing a flexible structure and the like, but surface hardness is decreased by the flexible properties or interlayer adhesiveness (adhesion) is decreased so that peeling easily occurs after coating. In order to solve the problems, an attempt had been made to introduce an adhesion promoter, but since the adhesion promoter is usually rigid, adhesiveness (adhesion) may be improved, but shattering resistance is significantly decreased.

Thus, in one implementation of this disclosure, in order to solve the problem, a stress relaxation segment is introduced into an polyimide precursor molecule and coated on UTG, and then curling is minimized and/or a decrease in surface hardness is minimized. A composition in the form of a polyamic acid, which is not a common adhesion promoter, is applied on a substrate, a polyimide precursor composition which has excellent shattering resistance properties and allows improvement of bending properties of a substrate is applied on the upper layer, and curing is performed to allow a chemical bond to be formed between layers, thereby improving shattering resistance and/or durability and/or minimizing substrate bending.

One implementation provides an optical multilayer structure comprising:
a substrate;
an adhesion promoting layer which is formed on any one or both surfaces of the substrate, the adhesion promoting layer being prepared from a composition comprising a polyimide resin; and
a shatterproof layer which is formed on the adhesion promoting layer, the shatterproof layer being prepared from a composition comprising a polyimide resin comprising a structural unit represented by the following Chemical Formula 1,
wherein the adhesion promoting layer and the shatterproof layer provide an optical multilayer structure connected by an imide bond:

[Chemical Formula 1]

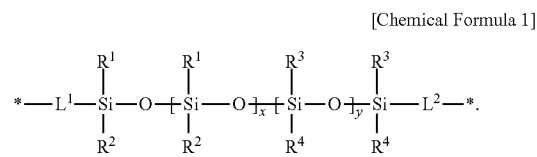

Also, the adhesion promoting layer and/or the shatterproof layer may comprise a polyimide film prepared from a composition comprising a polyimide precursor, a polyimide, and/or a combination thereof, and/or a polyimide resin.

Since the adhesion promoting layer of the optical multilayer structure according to one implementation is formed by applying a polyimide precursor composition or a polyamic acid (PAA) composition and then drying the composition, it exists in the form of a non-imidized polyamic acid before forming the shatterproof layer thereon. Meanwhile, when a composition for forming a shatterproof layer (that is, a polyimide precursor composition or a polyamic acid composition) is applied on the adhesion promoting layer and then cured to cause an imidation reaction, the polyamic acid of the adhesion promoting layer is then imidized, and a chemical bond(s) (imide bond(s)) is/are formed between the adhesion promoting layer and the shatterproof layer. The optical multilayer structure according to one implementation has excellently improved durability by forming a chemical bond(s) (imide bond(s)) between the adhesion promoting layer and the shatterproof layer.

In some embodiments, the imide bond may be formed by a chemical reaction.

In Chemical Formula 1,
$R^1$ and $R^2$ are independently of each other $C_{1-5}$ alkyl which is unsubstituted or substituted with one or more halogens;
$R^3$ and $R^4$ are independently of each other $C_{6-10}$ aryl which is unsubstituted or substituted with one or more halogens;
$L^1$ and $L^2$ are independently of each other $C_{1-10}$ alkylene; and
x and y are independently of each other an integer of 1 or more.

In some embodiments, $R^1$ and $R^2$ may be independently of each other $C_{1-3}$ alkyl which is unsubstituted or substituted with one or more halogens, $C_{1-2}$ alkyl which is unsubstituted or substituted with one or more halogens, or methyl which is unsubstituted or substituted with one or more halogens. Also, $R^3$ and $R^4$ may be independently of each other $C_{4-8}$ aryl which is unsubstituted or substituted with one or more halogens, $C_{6-8}$ aryl which is unsubstituted or substituted with one or more halogens, or phenyl which is unsubstituted or substituted with one or more halogens. Also, $L^1$ and $L^2$ may be independently of each other $C_{1-5}$ alkylene, $C_{2-5}$ alkylene, or propylene. The alkyl or the aryl substituted with one or more halogens may be substituted with one or more halogens selected from I, Br, Cl, and/or F.

In some embodiments, x and y may be independently of each other 1 to 100, 1 to 50, 1 to 30, or 1 to 20, but are not necessarily limited thereto. Also, for example, when the sum of x and y is 100, x may be 1 to 99 and y may be 99 to 1, or x may be 10 to 90 and y may be 90 to 10.

In some embodiments, the structure of Chemical Formula 1 may be a dimethylsiloxane-diphenylsiloxane (DMS-DPS) structure of the following Chemical Formula 2:

[Chemical Formula 2]

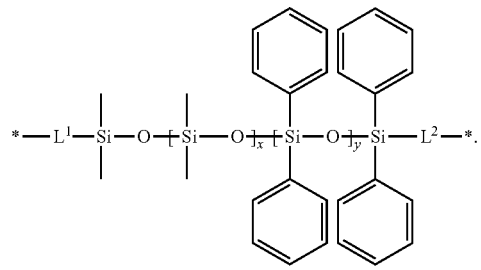

In some embodiments, the polyimide resin comprised in the composition for preparing the shatterproof layer may comprise a unit derived from a diamine and/or an acid anhydride comprising the structure represented by Chemical Formula 1. A non-limiting example of the diamine comprising the structure of Chemical Formula 1 comprises X-22-1660B-3 available from Shin-etsu having the following structure:

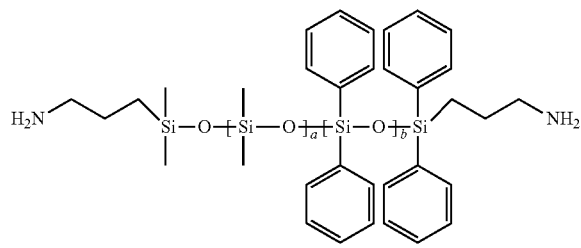

wherein a and b are independently of each other an integer of 1 or more, 1 to 50, 1 to 30, or 1 to 20, but is not necessarily limited thereto. Also, for example, when the sum of a and b is 100, a may be 1 to 99 and b may be 99 to 1, or a may be 10 to 90 and b may be 90 to 10.

The polyimide resin comprised in the composition for preparing shatterproof layer according to some embodiments comprises the structure of Chemical Formula 1 to have improved heat resistance, and thus, when an ultrathin glass is coated with the resin, curling due to a difference in thermal properties between different types of layers may be minimized.

In some embodiments, the shatterproof layer may be formed from a polyimide precursor composition comprising a polyimide precursor comprising the structural unit represented by Chemical Formula 1.

Also, in some embodiments, the adhesion promoting layer may be formed from a polyimide precursor composition comprising a polyimide precursor.

The polyimide precursor composition may comprise a solvent having a negative distribution coefficient (log P) and/or a solvent having a positive distribution coefficient. Non-limiting examples of the solvent having a negative distribution coefficient comprises propylene glycol methyl ether (PGME), dimethyl formamide (DMF), dimethyl acetamide (DMAc), N,N-dimethylpropanamide (DMPA), N-ethylprrolidone (NEP), methylpyrrolidone (NMP), or mixtures thereof. Non-limiting examples of the solvent having a positive distribution coefficient comprises cyclohexanone (CHN), N,N-diethylpropaneamide (DEPA), N,N-diethylacetamide (DEAc), N,N-diethylformamide (DEF) or mixtures thereof.

The distribution coefficient may be calculated with ACD/log P module of ACD/Percepta platform available from ACD/Labs, and the ACD/log P module may be measured with an algorithm based on quantitative structure-property relationship (QSPR) methodology using a 2D structure of a molecule. The results of measuring the log P value of the solvent with three models (Classic, GALAS, Consensus) of the program from ACD/Labs are shown in the following Table 1:

TABLE 1

|  | Classic | GALAS | Consensus |
|---|---|---|---|
| DMF | −1.01 | −0.70 | −0.78 |
| DMAc | −0.75 | −0.25 | −0.37 |
| DMPA | −0.21 | −0.05 | −0.10 |
| NMP | −0.40 | −0.33 | −0.34 |
| PGME | −0.45 | −0.14 | −0.22 |
| NEP | 0.13 | −0.10 | −0.05 |
| CHN | 0.76 | 0.95 | 0.90 |

In some embodiments, when two or more solvents are comprised in the polyimide precursor composition, a mass ratio of each solvent is not particularly limited.

In some embodiments, when the solvent comprised in the polyimide precursor composition is a mixed solvent of the solvent having a negative distribution coefficient and the solvent having a positive distribution coefficient, a mass ratio between the solvent having a negative distribution coefficient and the solvent having a positive distribution coefficient may be 5:5 to 9.5:0.5, 5:5 to 9:1, 6:4 to 9:1, 6.5:3.5 to 9:1, 7:3 to 9:1, or 7.5:2.5 to 8.5:1.5, but is not necessarily limited thereto.

In some embodiments, the solvent comprised in the polyimide precursor composition may comprise at least one, or one or more, two or more, three or more, or 1 to 3 hydroxyl groups (—OH) in the molecule. In some embodiments, the solvent may be a solvent comprising any one or more of an ether group (—O—) and/or an oxo group (═O).

In some embodiments, the structural unit represented by Chemical Formula 1 may be comprised at 40 wt % or more, 50 wt % or more, 60 wt % or more, 50 wt % to 80 wt %, 50 wt % to 70 wt %, 55 wt % to 70 wt %, or 60 wt % to 70 wt % with respect to the total weight of the unit derived from the diamine comprised in the polyimide precursor (or polyimide resin), but is not necessarily limited thereto.

In some embodiments, the structural unit represented by Chemical Formula 1 may be comprised at 30 wt % or more, 40 wt % or more, 30 wt % to 70 wt %, 30 wt % to 60 wt %, 40 wt % to 60 wt %, 35 wt % to 55 wt %, or 40 wt % to 50 wt % with respect to the total weight of the polyimide precursor (or polyimide resin), but is not necessarily limited thereto. Otherwise, the above weight range may be a weight range with respect to the total weight of a monomer for preparing a polyimide precursor of an acid anhydride and/or a diamine comprising the structure represented by Chemical Formula 1.

In some embodiments, the unit comprising the structure of Chemical Formula 1 may be a unit derived from an acid anhydride and/or a diamine comprising the structure of Chemical Formula 1. Herein, acid anhydride and/or the diamine may have a molecular weight of 3000 g/mol or more, 3500 g/mol or more, 4000 g/mol or more, 3000 g/mol to 5500 g/mol, 3500 g/mol to 5000 g/mol, or 4000 g/mol to 5500 g/mol, but is not necessarily limited thereto.

In some embodiments, when the adhesion promoting layer is laminated in the form of a polyimide precursor or a polyamic acid and forms an imide bond with a shatterproof layer by thermal curing after applying the shatterproof layer, there is no limitation in achieving the effect of the optical multilayer structure to be implemented, and thus, the monomer composition of the polyimide resin comprised in the adhesion promoting layer is not particularly limited. Also, when the shatterproof layer comprises a siloxane structure represented by Chemical Formula 1, there is no limitation in achieving the effect of the optical multilayer structure to be implemented, and thus, the monomer composition of the polyimide resin comprised in the shatterproof layer is not particularly limited. Therefore, the structure of the monomer described later is only an example, and should not be limited to the following examples.

The polyimide resin according to some embodiments may comprise a unit derived from a diamine represented by the following Chemical Formula 3:

[Chemical Formula 3]

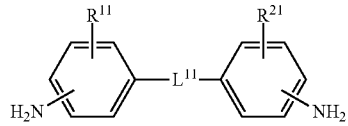

wherein $R^{11}$ and $R^{21}$ are independently of each other hydrogen or a $C_{1-20}$ monovalent organic group;

$L^{11}$ is —SO$_2$—, —O—, or —C(═O)O—, or a $C_{1-20}$ divalent organic group comprising any one or more of —SO$_2$—, —O—, or —C(═O)O—; and Chemical Formula 3 does not comprise a fluorine atom.

In some embodiments, $R^{11}$ and $R^{21}$ may be independently of each other selected from a $C_{1-15}$ monovalent organic group, a $C_{1-10}$ monovalent organic group, a $C_{1-8}$ monovalent organic group, a $C_{1-5}$ monovalent organic group, or a $C_{1-3}$ monovalent organic group. For example, the organic group may be selected from alkyl, alkenyl, alkynyl, cycloalkyl, heterocycloalkyl, aryl, heteroaryl, oxo(═O), ester, amide, or combinations thereof, but are not necessarily limited thereto.

In some embodiments, $L^{11}$ may be a $C_{1-18}$ divalent organic group, a $C_{1-15}$ divalent organic group, a $C_{1-10}$ divalent organic group, or a $C_{1-6}$ divalent organic group comprising any one or more of —SO₂—, —O—, and —C(=O)O—, or may be a combination of any one or more of —SO₂—, —O—, and —C(=O)O— and $C_{1-10}$ alkyl, $C_{5-18}$ cycloalkylene, and $C_{6-18}$ arylene, but is not necessarily limited thereto. In some embodiments, $L^{11}$ may be, for example, —SO₂—, —O—, —C(=O)O—,

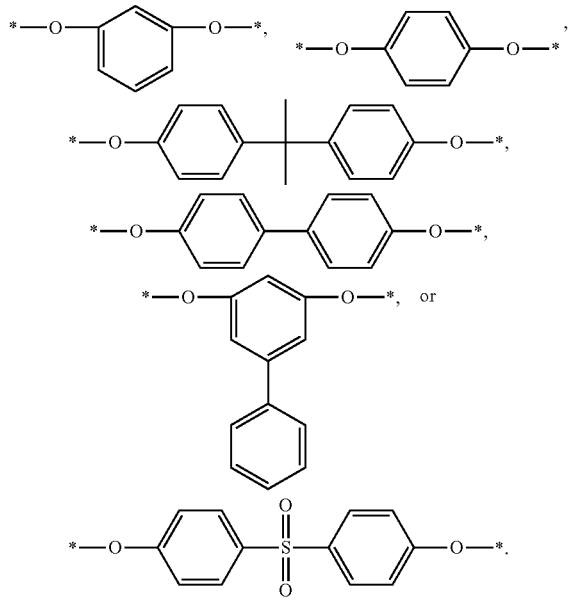

In some embodiments, $L^{11}$ may be substituted with a hydroxyl group, a thiol group, a nitro group, a cyano group, $C_{1-10}$ alkyl, $C_{6-20}$ aryl, or $C_{5-20}$ cycloalkyl. However, $L^{11}$ does not comprise a fluorine atom bond.

In some embodiments, the diamine represented by the structure of Chemical Formula 3 may be, for example, 1,3-bis(4-aminophenoxybenzene (TPER), 4,4'-oxydianiline (ODA), 2,2-bis[4-(4-aminophenoxy)phenyl]propane (BAPP), 4,4'-diaminodiphenyl sulfone (4,4'-DDS), 3,3'-diaminodiphenyl sulfone (3,3'-DDS), 1,3-bis(3-aminophenoxy)benzene (133APB), and/or 1,4-bis(4-aminophenoxy)benzene (144APB). In some embodiments, the polyimide precursor may comprise one or more or two or more of the diamines represented by the structure of Chemical Formula 3 without limitation.

The polyimide resin according to some embodiments comprises a unit derived from the diamine represented by Chemical Formula 3 containing no fluorine atom. In some embodiments, the polyimide film manufactured therefrom is colorless and transparent, residual stress occurring between glass substrates is low, and/or high adhesiveness (adhesion), high mechanical properties, and/or an appropriate glass transition temperature of 100° C. to 180° C. may be retained.

The polyimide resin according to some embodiments may comprise a unit derived from a fluorine-based diamine. The fluorine-based diamine refers to a diamine comprising a fluorine atom. An example of the fluorine-based diamine may comprise 2,2'-bis(trifluoromethyl)benzidine (TFMB), 2,2-bis[4-(4-aminophenoxy)phenyl]hexafluoropropane (HFBAPP), 2,2-bis(4-aminophenyl)hexafluoropropane (BAHF), 2,2'-bis(trifluoromethyl)-4,4'-diaminodiphenylether (6FODA), 4,4'-bis(4-amino-2-trifluoromethylphenoxy)biphenyl, and/or 1,4-bis(4-amino-2-trifluoromethylphenoxy)benzene (6FAPB), and/or the like.

In some embodiments, the polyimide resin may further comprise a unit derived from the diamine commonly used in the art disclosed in the present specification. For example, the unit derived from a diamine may comprise a unit derived from an aromatic diamine. The aromatic diamine may be a diamine comprising at least one aromatic ring, and the aromatic ring may be a single ring, a fused ring of two or more aromatic rings, or a non-fused ring in which two or more aromatic rings are linked by a single bond, a substituted or unsubstituted $C_{1-5}$ alkylene group, O, or C(=O). For example, the diamine may further comprise a unit derived from 2,2-bis(3-amino-4-hydroxyphenyl)-hexafluoropropane (6FAP), p-phenylenediamine (pPDA), m-phenylenediamine (mPDA), p-methylenedianiline (pMDA), or m-methylenedianiline (mMDA).

In some embodiments, the adhesion promoting layer may comprise a polyimide resin comprising a unit derived from an aromatic diamine.

In some embodiments, the polyimide resin may comprise a unit derived from an acid anhydride commonly used in the art. For example, the acid anhydride may be an acid anhydride comprising an aromatic ring, an acid anhydride comprising an aliphatic ring, a tetracarboxylic acid dianhydride, or a mixture thereof. In some embodiments, the acid anhydride may be one or more acid anhydrides selected from the group consisting of ethylene glycol bis(4-trimellitate anhydride) (TMEG-100), 4,4'-oxydiphthalic anhydride (ODPA), 2,2-bis[4-(2,3-dicarboxyphenoxy)phenyl]propane dianhydride, 4,4'-(3,4-dicarboxyphenoxy)diphenylsulfide dianhydride), pyromellitic dianhydride (PMDA), 3,3',4,4'-biphenyltetracarboxylic dianhydride (BPDA), 1,2,3,4-cyclobutanetetracarboxylic dianhydride (CBDA), 3,3',4,4'-benzophenonetetracarboxylic dianhydride (BTDA), 4,4'-(4,4'-isopropylidenediphenoxy)bis(phthalic anhydride) (BPADA), 3,3',4,4'-diphenylsulfone tetracarboxylic dianhydride (DSDA), 2,2'-bis-(3,4-dicarboxylphenyl) hexafluoropropane dianhydride (6FDA), p-phenylenebis(trimellitate anhydride) (TMHQ), 2,2'-bis(4-hydroxyphenyl)propanedibenzoate-3,3',4,4'-tetracarboxylicdianhydride (ESDA), naphthalenetetracarboxylic dianhydride (NTDA), derivatives thereof, and mixtures thereof.

For example, the acid anhydride may be a compound represented by the following Chemical Formula 4 or 5:

[Chemical Formula 4]

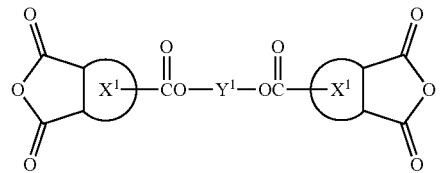

wherein
$X^1$ is independently of each other a $C_{3-10}$ aliphatic ring or a $C_{4-10}$ aromatic ring, and $Y^1$ is a linker comprising a single bond, a substituted or unsubstituted $C_{1-20}$ aliphatic chain, a substituted or unsubstituted $C_{3-10}$ aliphatic ring and/or a substituted or unsubstituted $C_{4-10}$ aromatic ring; or $Y^1$ may comprise two or more $C_{4-10}$ arylene linked by $C_{1-20}$ alkylene, $C_{1-10}$ alkylene, $C_{1-5}$ alkylene, $C_{3-10}$ cycloalkylene, $C_{4-10}$ arylene, two or more $C_{3-10}$ cycloalkylenes linked by $C_{1-20}$ alkylene, or two or more $C_{4-10}$ arylene linked by $C_{1-20}$ alkylene,

[Chemical Formula 5]

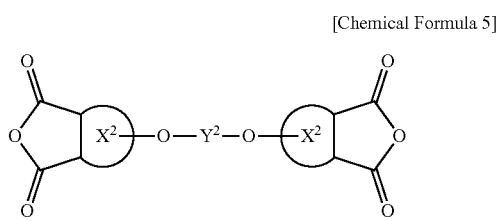

wherein

X² is independently of each other a $C_{3-10}$ aliphatic ring or a $C_{4-10}$ aromatic ring, and Y² is a linker comprising a single bond, a substituted or unsubstituted $C_{1-20}$ aliphatic chain, a substituted or unsubstituted $C_{3-10}$ an aliphatic ring and/or a substituted or unsubstituted $C_{4-10}$ aromatic ring; or Y² may comprise $C_{1-20}$ alkylene, $C_{1-10}$ alkylene, $C_{1-5}$ alkylene, $C_{3-10}$ cycloalkylene, $C_{4-10}$ arylene, two or more $C_{3-10}$ cycloalkylenes linked by $C_{1-20}$ alkylene, or two or more $C_{4-10}$ arylene linked by $C_{1-20}$ alkylene.

In some embodiments, the acid anhydride may be any one or more of the compound groups represented by the following chemical formulae:

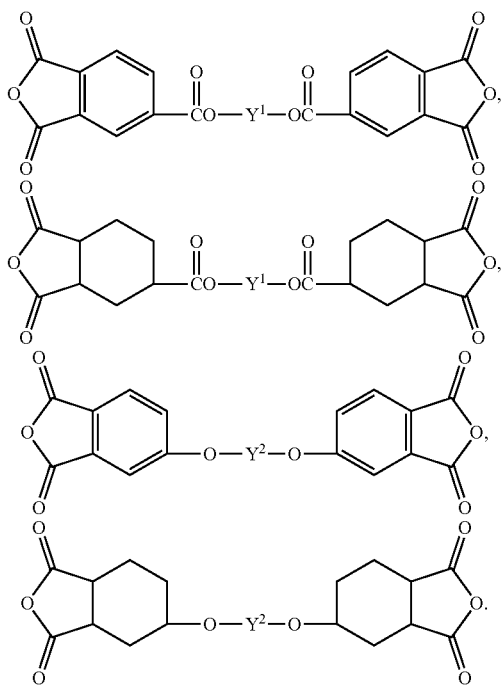

In some embodiments, the acid anhydride may be comprised at about 30 mol % to 70 mol %, 40 mol % to 60 mol %, 45 mol % to 55 mol %, or about 50 mol %, based on the total moles of the monomer of the polyimide precursor. Otherwise, the acid anhydride may be comprised at 20 wt % to 70 wt %, 20 wt % to 60 wt %, 30 wt % to 60 wt %, 20 wt % to 50 wt %, 30 wt % to 60 wt %, or 40 wt % to 60 wt % with respect to the total weight of the polyimide precursor, but is not necessarily limited thereto.

In some embodiments, the polyimide precursor composition, the shatterproof layer, and/or the adhesion promoting layer may comprise inorganic particles. The inorganic particles according to some embodiments may be inorganic nanoparticles, and may have an average diameter of, for example, 5 nm to 50 nm, or 5 nm to 30 nm, or 5 nm to 20 nm, but is not necessarily limited thereto.

The average diameter may be measured by, for example, observing particles by an optical microscope, or using scanning electron microscope (SEM), transmission electron microscope (TEM), scanning probe microscope (SPM), scanning tunneling microscope (STM), atomic force microscope (AFM), using a particle size analyzer. For example, it may be obtained by irradiating a composition comprising inorganic particles with laser using a laser particle size analyzer and inferring a particle size from a correlation between diffraction and a particle size. For example, it may be D50, D10, or D90 value. Otherwise, for example, it may be an area average (Ma), a number average (Mn), or a volume average (Mv) value.

In some embodiments, the inorganic particles may comprise silica, zirconium oxide, titanium oxide, zinc oxide, zinc sulfide, chromium oxide, barium titanate, or a combination thereof. The inorganic particles may be mixed with the polyimide resin in the form of being dispersed in an organic solvent, or may be a surface-treated material for improving dispersity. For example, the inorganic particles according to some embodiments may have a surface substituted with a $C_{1-5}$ alkoxy group, or, for example, substituted with a methoxy group or an ethoxy group. Meanwhile, the surface treatment may be performed by adopting a known surface treatment method without limitation, and thus, is not particularly limited.

In some embodiments, the inorganic particles may be chemically bonded to a substituent of the compound represented by Chemical Formula 1. Also, without being bound to a certain theory, the polyimide precursor composition according to some embodiments comprises the inorganic particles, thereby improving a decrease in surface hardness of a conventional shatterproof layer better.

In some embodiments, the inorganic particles may be comprised at 1 wt % to 30 wt %, 2 wt % to 25 wt %, 5 wt % to 20 wt %, or 1 wt % to 25 wt %, with respect to the total weight of the polyimide precursor composition, but is not necessarily limited to the range.

In some embodiments, a solid concentration (content) of the polyimide precursor composition may be 40 wt % or less, 35 wt % or less, 30 wt % or less, or 1 wt % to 40 wt %, based on the total weight of the polyimide precursor composition. In some embodiments, the solid concentration of the polyimide precursor composition for forming an adhesion promoting layer may be about 1 wt % to 20 wt %, 1 wt % to 15 wt %, 1 wt % to 10 wt %, 5 wt % to 10 wt %, or about 6 wt %.

In some embodiments, the solid concentration of the polyimide precursor composition for forming a shatterproof layer may be about 5 wt % to 40 wt %, 10 wt % to 40 wt %, 10 wt % to 30 wt %, 20 wt % to 30 wt %, or about 25 wt %. Herein, the solid content may be a polyamic acid and/or a polyimide.

In some embodiments, the molecular weight of the polyimide precursor and/or the polyimide may be 500 g/mol to 200,000 g/mol or 10,000 g/mol to 100,000 g/mol, and is not necessarily limited thereto.

In some embodiments, the polyimide precursor composition may further comprise any one or more of blue series pigments and/or dyes.

A maximum absorption wavelength of the blue series pigments or dyes is not particularly limited as long as it is in a range comprising a yellow series wavelength range, but, for example, may be 520 nm to 680 nm, 520 nm to 650 nm, 550 nm to 650 nm, or 550 nm to 620 nm. By using the pigment or dyes having the maximum absorption wavelength in the range described above, the light absorption phenomenon in the blue or violet wavelength of the polyimide film manufactured from the polyimide precursor composition according to some embodiments may be effectively offset and the yellow index may be improved more effectively. Furthermore, by appropriately selecting the maximum absorption wavelength range of the inorganic pigment depending on the type and the composition of monomers used in the preparation of the polyimide precursor composition, or the optical properties of the polyimide film, even the optical properties such as a yellow index, a refractive index, and/or a retardation in the thickness direction of the film may be made better.

The pigment may be used without a particular limitation as long as it is a blue series pigment or a known pigment having a maximum absorption wavelength of 520 nm to 680 nm, and for example, may be an inorganic pigment comprising natural minerals; or one or more metal(s) selected from zinc, titanium, lead, iron, copper, chromium, cobalt, molybdenum, manganese, and/or aluminum, or metal oxide(s) thereof. The pigment may be used by being comprised in a pigment dispersion with a dispersing agent.

In some embodiments, the inorganic pigment may have an average particle size of 30 nm to 100 nm, 50 nm to 100 nm or 70 nm to 100 nm, but is not necessarily limited thereto. The average particle size of the inorganic pigment may be, for example, measured in the dispersion or measured in the polyimide film. In some embodiments, for example, the solid phase average particle size before dispersing the pigment may be, for example, 10 nm to 70 nm, for example, 30 nm to 70 nm, or 50 nm to 70 nm.

A means such as ultrasonic waves may be used in the pigment for improving dispersibility, and a dispersing agent may be used. The dispersing agent is not particularly limited as long as it may prevent agglomeration between pigments and improve dispersibility and dispersion stability of the pigment, but for example, may have a functional group having high affinity to a functional group adsorbed to the pigment and/or a dispersion medium (the organic solvent), and may be determined by adjusting a balance between the two functional groups. As the dispersing agent, various types may be used depending on the surface state of the pigment which is a subject to be dispersed. For example, the pigment dispersing agent according to some embodiments may have an acidic functional group, and in this case, the acidic functional group may be adsorbed to the pigment. The acidic functional group may be, for example, a carboxylic acid.

In some embodiments, the dye may be a blue series dye, or a known dye having a maximum absorption wavelength of 520 nm to 680 nm without a particular limitation, and for example, may comprise an acidic dye, a direct dye, a mordant dye, and/or the like. As a chemical structure, an azo-based dye, a cyanine-based dye, a triphenylmethane-based dye, a phthalocyanine-based dye, an anthraquinone-based dye, a naphthoquinone-based dye, a quinoneimine-based dye, a methine-based dye, an azomethine-based dye, a squarylium-based dye, an acridine-based dyes, a styryl-based dye, a coumarin-based dye, a quinoline-based dye, a nitro-based dye, an indigo-based dye, and/or the like may be comprised.

In some embodiments, the pigment may be comprised at 10 ppm to 1,500 ppm, or, for example, 100 ppm to 1,500 ppm or 500 ppm to 1,500 ppm, based on the solid content of the polyamic acid and/or the polyimide comprised in the polyimide precursor composition. Herein, the solid content of the polyamic acid and/or the polyimide may refer to a polyamic acid and/or a polyimide.

In some embodiments, the dye may be comprised at 10 ppm to 500 ppm, 10 ppm to 300 ppm, 10 ppm to 200, 50 ppm to 200 ppm, or 80 ppm to 200 ppm, based on the solid content of the polyamic acid and/or the polyimide comprised in the polyimide precursor composition. Herein, the solid content of the polyamic acid and/or the polyimide may refer to a polyamic acid and/or a polyimide.

In some embodiments, the polyimide precursor composition may further comprise an additive commonly used in the art disclosed in the present specification, and for example, may further comprise a flame retardant, an adhesive strength improver, an antioxidant, a UV protection agent, and/or a plasticizer.

Figure 2:
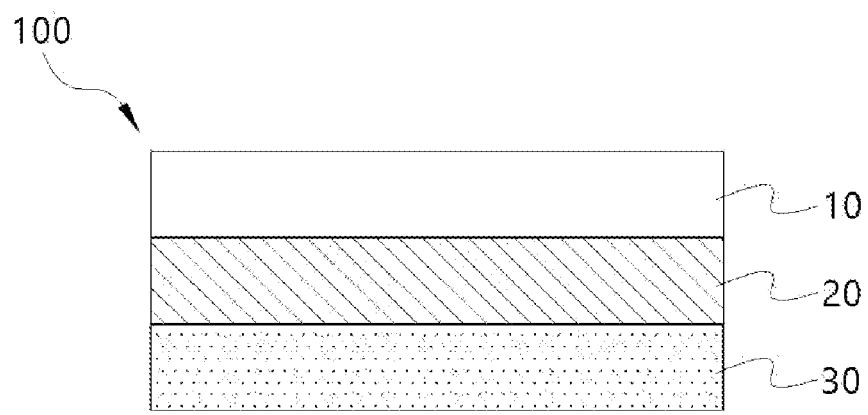
FIG. 2 schematically shows a structure of an optical multilayer structure according to one implementation, in which an adhesion promoting layer 20 and a shatterproof layer 30 are laminated on a rear surface of a substrate 10.
Figure 3:
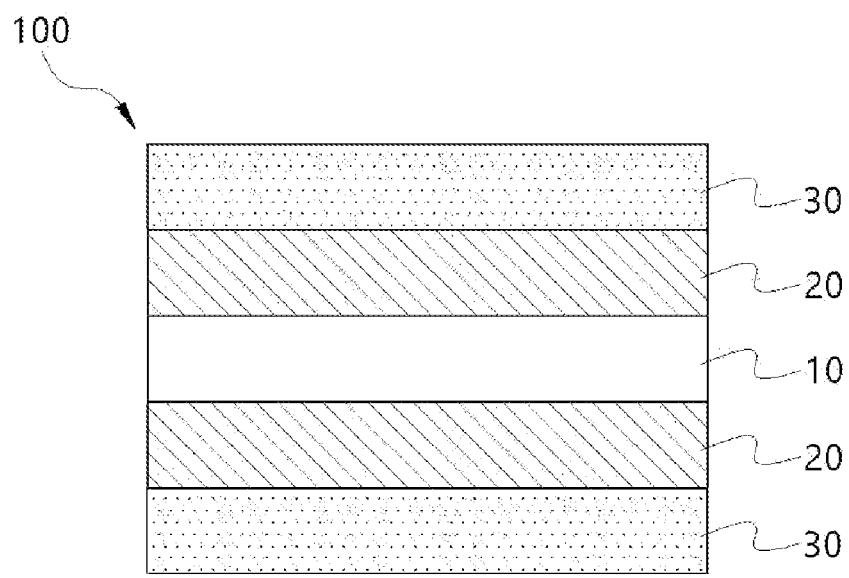
FIG. 3 schematically shows a structure of an optical multilayer structure according to one implementation, in which an adhesion promoting layer 20 and a shatterproof layer 30 are laminated on both surfaces of a substrate 10.

The optical multilayer structure according to some embodiments may have an adhesion promoting layer and a shatterproof layer formed on a single surface, a rear surface, or both surfaces of a substrate. Non-limiting examples of lamination structures of the optical multilayer structure according to some embodiments is as follows:

(1) an optical multilayer structure comprising a structure in which an adhesion promoting layer is formed on a substrate and a shatterproof layer is formed on the adhesion promoting layer (single surface, FIG. 1);

(2) an optical multilayer structure comprising a structure in which an adhesion promoting layer is formed under or on the rear of a substrate and a shatterproof layer is formed on the adhesion promoting layer (rear surface, FIG. 2); and (3) an optical multilayer structure comprising a structure in which an adhesion promoting layer is formed on a substrate, a shatterproof layer is formed on the adhesion promoting layer, the adhesion promoting layer is formed under or on the rear of the substrate, and the shatterproof layer is formed on the adhesion promoting layer (both surfaces, FIG. 3).

Figure 4:
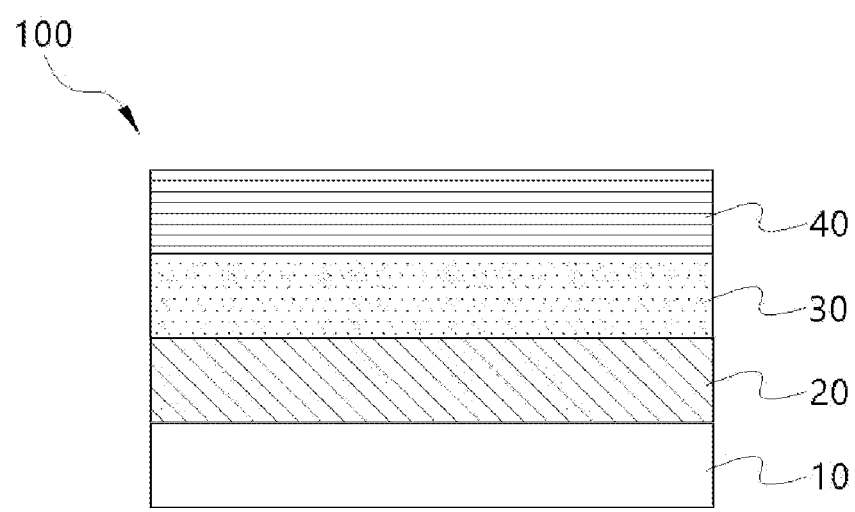
FIG. 4 schematically shows a structure of an optical multilayer structure according to one implementation comprising a hard coating layer, in which an adhesion promoting layer 20 and a shatterproof layer 30 are laminated on a single surface of a substrate 10.
Figure 5:
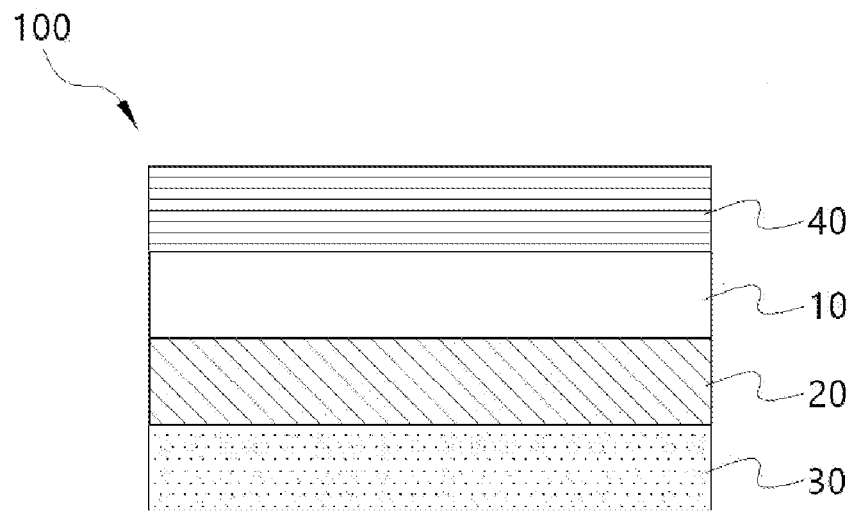
FIG. 5 schematically shows a structure of an optical multilayer structure according to one implementation comprising a hard coating layer, in which an adhesion promoting layer 20 and a shatterproof layer 30 are laminated on a rear surface of a substrate 10.
Figure 6:
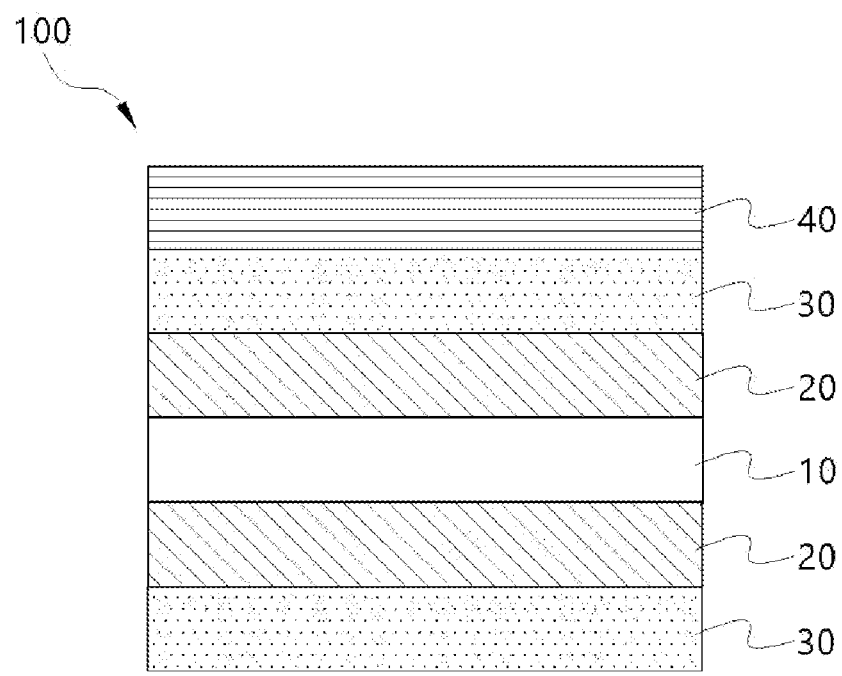
FIG. 6 schematically shows a structure of an optical multilayer structure according to one implementation comprising a hard coating layer, in which an adhesion promoting layer 20 and a shatterproof layer 30 are laminated on both surfaces of a substrate 10.

Otherwise, the optical multilayer structure according to some embodiments may further comprise a hard coating layer. The hard coating layer may protect the multilayer structure from external physical and chemical damage. The hard coating layer may be, for example, formed on the shatterproof layer, or when the adhesion promoting layer is formed on any one surface, the hard coating layer may be formed on the other surface of the substrate on which the adhesion promoting layer is not formed. An example of the lamination structure of the optical multilayer structure comprising the hard coating layer according to some embodiments is as follows:

(4) an optical multilayer structure comprising a structure in which an adhesion promoting layer is formed on a substrate, a shatterproof layer is formed on the adhesion promoting layer, and a hard coating layer is formed on the shatterproof layer (single surface, FIG. 4);

(5) an optical multilayer structure comprising a structure in which an adhesion promoting layer is formed under or on the rear of a substrate, a shatterproof layer is formed on the adhesion promoting layer, and a hard coating layer is formed on the substrate on which the adhesion promoting layer is not formed (rear surface, FIG. 5); and (6) an optical multilayer structure comprising a structure in which an adhesion promoting layer is formed on a substrate, a shatterproof layer is formed on the adhesion promoting layer, a hard coating layer is formed on the shatterproof layer, the adhesion promoting layer is formed under or on the rear of the substrate, and the shatterproof layer is formed on the adhesion promoting layer (both surfaces, FIG. 6).

In some embodiments, a display element may be disposed on any one surface of the substrate or in the lowest layer of the optical multilayer structure.

In some embodiments, the substrate may be an ultrathin glass (UTG). Otherwise, the substrate may be manufactured from, for example, one or more of polyester-based resins such as polyethylene terephthalate, polyethylene isophthalate, and/or polybutylene terephthalate; cellulose-based resins such as diacetyl cellulose and/or triacetyl cellulose; polycarbonate-based resins; acrylic resins such as polymethyl (meth)acrylate and/or polyethyl (meth)acrylate; styrene-based resins such as a polystyrene acrylonitrile-styrene copolymer; polyolefin-based resin having a polyethylene, polypropylene, cyclo-based and/or norbornene structure, polyolefin-based resins such as an ethylenepropylene copolymer; polyimide-based resins; polyamide-based resins; polyethersulfone-based resins; sulfone-based resins, and/or the like, and these resins may be used alone or in combination of two or more.

In some embodiments, the thickness of the substrate is not particularly limited, but may be, for example, 1 μm to 100 μm, 5 μm to 100 μm, 10 μm to 100 μm, 30 μm to 100 μm, 20 μm to 60 μm, 20 μm to 50 μm, or 25 μm to 35 μm.

In some embodiments, the thickness of the shatterproof layer is not particularly limited, but may be, for example, 1 μm to 100 μm, 1 μm to 80 μm, 1 μm to 50 μm, 1 μm to 30 μm, 1 μm to 20 μm, or 3 μm to 15 μm.

In some embodiments, the thickness of the adhesion promoting layer is not particularly limited, but may be, for example, 10 μm or less, 8 μm or less, 5 μm or less, or 4 μm or less and 1 nm or more, 50 nm or more, or 100 nm or more.

In some embodiments, when the thickness of the substrate (or glass substrate) is more than 20 μm, the thicknesses of the substrate and the adhesion promoting layer may satisfy the relationship of the following Equation 1:

$$y \geq 0.05x - 1 \qquad \text{[Equation 1]}$$

wherein x (μm) is the thickness of the substrate, and y (μm) is the thickness of the adhesion promoting layer.

When the substrate and the adhesion promoting layer according to some embodiments satisfy the thickness relationship according to Equation 1, shattering resistance and/or thermal expansion-shrinkage behavior relaxation may be better implemented. However, since Equation 1 only exemplifies some embodiments of the thicknesses of the adhesion promoting layer and the substrate comprised in the optical multilayer structure according to some embodiments, it should not be considered that the thicknesses of the substrate and the adhesion promoting layer according to an embodiment are defined by Equation 1.

In some embodiments, the hard coating layer may be formed by curing a composition for forming a hard coating layer, and/or may be a composite hard coating layer obtained by photocuring and then thermally curing the composition for forming a hard coating layer.

In some embodiments, the hard coating layer may comprise a compound comprising an epoxy group or an acrylic resin. Otherwise, the hard coating layer may be formed by comprising a condensate of alkoxysilane having an epoxy group, and for example, the condensate of alkoxysilane having an epoxy group may be a siloxane-based resin comprising an epoxy group, but is not necessarily limited thereto. The condensate of alkoxysilane having an epoxy group may have excellent hardness and low bending properties when cured.

The epoxy group may be any one or more selected from a cyclic epoxy group, an aliphatic epoxy group, and/or an aromatic epoxy group, and the siloxane resin may refer to a polymer compound in which a silicon atom and an oxygen atom form a covalent bond.

In some embodiments, the condensate of alkoxysilane having an epoxy group may be a silsesquioxane resin having an epoxy group, or a silsesquioxane resin in which a silicon atom is directly substituted with an epoxy group or a substituent of the silicon atom is substituted with an epoxy group, or the condensate of alkoxysilane having an epoxy group may be a silsesquioxane resin substituted with 2-(3, 4-epoxycyclohexyl)ethyl group, but is not necessarily limited thereto.

In some embodiments, the condensate of alkoxysilane having an epoxy group may have a weight average molecular weight of 1,000 g/mol to 20,000 g/mol, 1,000 g/mol to 18,000 g/mol, or 2,000 g/mol to 15,000 g/mol. When the weight average molecular weight is in the range described above, flowability, coatability, curing reactivity, and/or the like of the composition for forming a hard coating layer may be further improved.

In some embodiments, the siloxane-based compound having an epoxy group may comprise a repeating unit derived from an alkoxysilane compound represented by the following Chemical Formula 6:

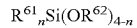  [Chemical Formula 6]

$$R^{61}{}_n Si(OR^{62})_{4-n}$$

wherein $R^{61}$ is a straight-chain or branched-chain alkyl group having 1 to 6 carbon atoms substituted with an epoxycycloalkyl group having 3 to 6 carbon atoms or an oxiranyl group, in which the alkyl group may comprise an ether group, $R^{62}$ is a straight-chain or branched-chain alkyl group having 1 to 7 carbon atoms, and n is an integer of 1 to 3.

The alkoxysilane compound represented by Chemical Formula 6 may be, for example, 2-(3,4-epoxycyclohexyl)ethyltrimethoxysilane, 2-(3,4-epoxycyclohexyl)ethyltriethoxysilane, 3-glycidoxypropyltrimethoxysilane, and/or the like and may be used alone or in combination of two or more, but is not necessarily limited thereto.

In some embodiments, the condensate of alkoxysilane having an epoxy group may be comprised at 20 wt % to 70 wt % or 20 wt % to 50 wt % with respect to the weight of the composition for forming a hard coating layer, but is not necessarily limited thereof.

In some embodiments, the composition for forming a hard coating layer may further comprise inorganic particles. The inorganic particles may be the same as the inorganic particles which may be comprised in the polyimide precursor composition described above, but are not necessarily limited thereto. Also, the composition for forming a hard coating layer may further comprise an additive such as are described above for improving scratch resistance and/or wear resistance, or may comprise a layer which implements scratch resistance and/or wear resistance.

In some embodiments, the composition for forming a hard coating layer may have excellent flowability and coatability, may be uniformly cured during the curing of the composition for forming a hard coating layer to allow effective prevention of physical defects such as cracks by overcuring, and/or may show excellent hardness.

In some embodiments, the thickness of the hard coating layer may be 1 μm to 100 μm, 1 μm to 80 μm, 1 μm to 50 μm, 1 μm to 30 μm, 1 μm to 20 μm, or 3 μm to 15 μm, but is not necessarily limited thereto.

In some embodiments, the optical multilayer structure may further comprise an antistatic layer, an anti-fingerprint layer, an anti-scratch layer, a low refractive index layer, a low reflection layer, a water repellent layer, an anti-reflection layer, and/or a shock absorption layer, and/or the like.

The optical multilayer structure according to some embodiments comprises the adhesion promoting layer and the shatterproof layer, thereby effectively improving a conventional decrease in surface hardness. The optical multilayer structure according to some embodiments may have a surface hardness of 1H or more, 5H or less, 4H or less, 3H or more, 1H to 4H, 2H to 4H, or 3H to 4H. The surface hardness may be an outermost surface hardness of the optical multilayer structure, or a surface hardness of the shatterproof layer and/or the hard coating layer forming the optical multilayer structure. In some embodiments, the surface hardness may be measured by applying a load of a weight of 750 g using a pencil hardness tester, and specifically, may be measured by 10 mm by setting an angle of a pencil and a specimen of about 45° at a speed of 20 mm/min. Herein, the measurement is performed three times per one specimen, and the average surface hardness value may be indicated. Also, when the scratches of the specimen are two or more, it is determined to be defective, but the surface hardness value may refer to a value before defects occurred.

The optical multilayer structure according to some embodiments comprises the adhesion promoting layer and the shatterproof layer, thereby improving substrate bending excellently. In some embodiments, when a curl amount is calculated by measuring heights of both ends of the multilayer structure from the ground using a ruler (or an average of the values measured at both ends, respectively, is calculated), the value may be 3.0 mm or less, 2.0 mm or less, 1.7 mm or less, 1.0 mm or less, 0.5 mm or less, 0.01 mm to 3.0 mm, 0.01 mm to 2.0 mm, 0.01 to 1.0 mm, 0.05 to 0.8 mm, 0.05 mm to 0.6 mm, 0.1 mm to 0.6 mm, 0.1 mm to 0.5 mm, 0.1 mm to 0.4 mm, 0.1 mm to 0.3 mm, or 0.1 mm to 0.2 mm, but is not necessarily limited thereto.

The optical multilayer structure according to some embodiments comprises the adhesion promoting layer and the shatterproof layer, thereby implementing the transparency of the optical multilayer structure excellently. In some embodiments, when the haze of the optical multilayer structure is measured in accordance with the ASTM D1003 standard, the value may be 1.0% or less, 0.8% or less, 0.5% or less, 0.4% or less, 0.3% or less, 0.2% or less, 0.1% to 1.0%, 0.1% to 0.8%, 0.1% to 0.5%, 0.1% to 0.3%, 0.1% to 0.2%, or about 0.1%.

The optical multilayer structure according to some embodiments comprises the adhesion promoting layer and the shatterproof layer, thereby improving interlayer adhesiveness excellently. In some embodiments, when a cross-cut test is performed, the number of fallen fragments may be 30 or less, 20 or less, 10 or less, or 5 or less, or no fragment may be fallen.

When a total light transmittance of the optical multilayer structure according to some embodiments is measured at 400 nm to 700 nm in accordance with ASTM D1746, the value may be 80% or more, 85% or more, 88% or more, 90% or more, 85% to 98%, 90% to 95%, or 90% to 93%.

One implementation provides a method for manufacturing an optical multilayer structure.

In some embodiments, the manufacturing method may comprise: applying a polyimide precursor composition on any one or both surfaces of a substrate and drying the composition to form an adhesion promoting layer; and applying a polyimide precursor composition comprising a structural unit represented by Chemical Formula 1 and curing the composition to form a shatterproof layer.

Herein, as the polyimide precursor composition and/or the polyimide precursor composition comprising the structural unit represented by Chemical Formula 1, the polyimide precursor composition according to some embodiments may be identically applied.

In some embodiments, the polyimide precursor composition may be prepared by a method comprising reacting a monomer comprising an acid anhydride and a diamine under a solvent to prepare a polyimide precursor composition (polyamic acid solution). Also, after preparing of a polyimide precursor composition (polyamic acid solution), a step of further adding a solvent may be further comprised. As the solvent, the above description of the solvent in the embodiment may be identically applied.

In the method for manufacturing an optical multilayer structure according to one implementation, the forming of an adhesion promoting layer is a step of applying a polyimide precursor composition (or composition for forming an adhesion promoting layer) and drying the composition to evaporate a solvent, thereby forming an adhesion promoting layer in the form of a polyimide precursor or a polyamic acid. Herein, the drying may be performed at a temperature of 40° C. to 120° C., 40° C. to 100° C., 50° C. to 100° C., 60° C. to 100° C., 70° C. to 90° C., or about 80° C. for 1 minute to 30 minutes, 1 minute to 20 minutes, 5 minutes to 30 minutes, 5 minutes to 20 minutes, 5 minutes to 15 minutes, or about 10 minutes. In the forming of an adhesion promoting layer, it is preferred that the adhesion promoting layer comprises a polyimide precursor or a not-imidized polyamic acid form, whereby the adhesion promoting layer and a shatterproof layer which are cured together after forming the shatterproof layer later form a chemical bond (imide bond).

In some embodiments, the forming of a shatterproof layer may be performed by applying a polyimide precursor composition comprising the structural unit represented by Chemical Formula 1 (or composition for forming a shatterproof layer) and curing the composition. The curing may comprise, for example, 1 or 2 or more heat treatment steps. For example, it may comprise a first heat treatment step at a temperature of 40° C. to 120° C., 40° C. to 100° C., 50° C. to 100° C., 60° C. to 100° C., 70° C. to 90° C., or about 80° C. for 1 minute to 30 minutes, 1 minute to 20 minutes, 5 minutes to 30 minutes, 5 minutes to 20 minutes, 5 minutes to 15 minutes, or about 10 minutes, and then a second heat treatment step at a temperature of 150° C. to 300° C., 180° C. to 280° C., 200° C. to 280° C., 200° C. to 250° C., or about 230° C. for about 1 minute to 30 minutes, 1 minute to 20 minutes, 5 minutes to 20 minutes, or about 15 minutes.

The method for manufacturing an optical multilayer structure according to some embodiments may further comprise applying a composition for forming a hard coating layer, and drying and curing the composition to form the hard coating layer. For example, the method may further comprise applying a composition for forming a hard coating layer on a shatterproof layer and drying and curing the composition to form the hard coating layer (single surface or both surfaces), or when the adhesion promoting layer is formed on any one surface of the substrate, the method may further comprise applying the composition for forming a hard coating layer on the other surface on which the adhesion promoting layer is not formed and drying and curing the composition to form a hard coating layer. In some embodiments, the drying may be drying at a temperature of 40° C. to 100° C., 40° C. to 80°

C., 50° C. to 80° C., 50° C. to 70° C., or about 60° C. for 30 seconds to 10 minutes, 30 seconds to 8 minutes, 1 minute to 5 minutes, or about 3 minutes. The curing may be curing at a temperature of 100° C. to 200° C., 120° C. to 180° C., 130° C. to 170° C., 140° C. to 160° C., or about 150° C. for 1 minute to 30 minutes, 5 minutes to 20 minutes, 5 minutes to 15 minutes, 8 minutes to 12 minutes, or about 10 minutes, after irradiation with ultraviolet (UV) rays using a high pressure metal lamp.

In some embodiments, the hard coating layer may be formed by further comprising a crosslinking agent having a polyfunctional epoxy group. Herein, the crosslinking agent may comprise a compound having an alicyclic epoxy group, and for example, the crosslinking agent may comprise a compound having two 3,4-epoxycyclohexyl groups bonded, but is not necessarily limited thereto. The crosslinking agent may have a structure and properties similar to the condensate of alkoxysilane having an epoxy group, and in this case, may promote crosslinking of the condensate of alkoxysilane.

In some embodiments, the hard coating layer may be formed by further comprising a thermal initiator and/or a photoinitiator.

In some embodiments, when a thermal initiator is used in the hard coating layer, a cure half-life may be shortened and thermal curing may be rapidly performed even in low-temperature conditions, and thus, damage and deformation due to a long-term heat treatment under high-temperature conditions may be prevented. The thermal initiator may promote the crosslinking reaction of the epoxy siloxane resin or the crosslinking agent when heat is applied to the composition for forming a hard coating layer. As the thermal initiator, a cationic thermal initiator may be used, but the present disclosure is not necessarily limited thereto.

In some embodiments, when forming the hard coating layer, the thermal curing using a thermal initiator and the photocuring using a photoinitiator are used in combination, thereby improving the curing degree, the hardness, the flexibility, and/or the like of the hard coating layer. For example, the composition for forming a hard coating layer is applied to a substrate or the like and irradiated with ultraviolet rays (photocuring) to at least partially cure the composition, and then heat is further applied (thermal curing), thereby performing substantially complete curing.

In some embodiments, the composition for forming a hard coating layer may be semi-cured or partially cured by the photocuring, and the composition for forming a hard coating layer which has been semi-cured or partially cured may be substantially completely cured by the thermal curing. For example, when the composition for forming a hard coating layer is cured only by the photocuring, a curing time may be excessively extended or curing may not be completely performed in some parts. However, when the photocuring is followed by the thermal curing, the portion which is not cured by the photocuring may be substantially completely cured by the thermal curing, and the curing time may be also reduced.

Also, generally, when a portion which has been already appropriately cured is provided with excessive energy due to an increased curing time (for example, an increased light exposure time), this may cause overcuring. When the overcuring proceeds, the hard coating layer loses flexibility or mechanical defects such as curls or cracks may occur. However, when the photocuring and the thermal curing are used in combination, the composition for forming a hard coating layer may be substantially completely cured within a short time and the hardness of the hard coating layer may be further improved while the flexibility of the hard coating layer is maintained.

Though the method for first photocuring and then further thermally curing the composition for forming a hard coating layer has been described above, the sequence of the photocuring and the thermal curing is not particularly limited thereto. That is, in some embodiments, the thermal curing may be first performed and then the photocuring may be performed, of course.

In some embodiments, the thermal initiator may be comprised at 0.1 parts by weight to 20 parts by weight or 1 part by weight to 20 parts by weight with respect to 100 parts by weight of the condensate of alkoxysilane having an epoxy group, but is not necessarily limited thereto. Also, for example, the thermal initiator may be comprised at 0.01 parts by weight to 15 parts by weight, 0.1 parts by weight to 15 parts by weight, or 0.3 parts by weight to 10 parts by weight with respect to a total of 100 parts by weight of the composition for forming a hard coating layer, but is not necessarily limited thereto.

In some embodiments, the photoinitiator may comprise a photocationic initiator. The photocationic initiator may initiate polymerization of the epoxy siloxane resin and an epoxy-based monomer. As the photo-cationic initiator, an iodonium salt, an onium salt and/or an organic metal salt, and the like may be used, and for example, a diaryliodonium salt, a triarylsulfonium salt, an aryldiazonium salt, an iron-arene composite, and/or the like may be used alone or in combination of two or more, but the present disclosure is not necessarily limited thereto.

The content of the photoinitiator is not particularly limited, but for example, the photoinitiator may be comprised at 0.1 parts by weight to 15 parts by weight or 1 part by weight to 15 parts by weight with respect to 100 parts by weight of the condensate of alkoxysilane having an epoxy group, but is not necessarily limited thereto.

Also, for example, the photoinitiator may be comprised at 0.01 parts by weight to 10 parts by weight, 0.1 parts by weight to 10 parts by weight, or 0.3 parts by weight to 5 parts by weight with respect to a total of 100 parts by weight of the composition for forming a hard coating layer, but is not necessarily limited thereto.

In some embodiments, the composition for forming a hard coating layer may further comprise a solvent. The solvent is not particularly limited and may be a solvent known in the art.

A non-limiting example of the solvent may comprise one or more of alcohol-based solvents (such as methanol, ethanol, isopropanol, butanol, methyl cellosolve, and/or ethyl cellosolve), ketone-based solvents (such as methyl ethyl ketone, methyl butyl ketone, methyl isobutyl ketone, diethyl ketone, dipropyl ketone, and/or cyclohexanone), hexane-based solvents (such as hexane, heptane, and/or octane), benzene-based solvents (such as benzene, toluene, and/or xylene), and/or the like. These may be used alone or in combination of two or more.

In some embodiments, the composition for forming a hard coating layer may further comprise an inorganic filler. The inorganic filler may further improve the hardness of the hard coating layer.

The inorganic filler is not particularly limited, and an example thereof may comprise metal oxides such as silica, alumina, and/or titanium oxide; hydroxides such as aluminum hydroxide, magnesium hydroxide, and/or potassium hydroxide; metal particles such as gold, silver, bronze, nickel, and/or alloys thereof; conductive particles such as carbon, carbon nanotubes, and/or fullerene; glass; ceramic; and/or the like, or in terms of compatibility with other components of the composition for forming a hard coating layer, silica may be used, and these may be used alone or in combination of two or more, but the present disclosure is not necessarily limited thereto.

In some embodiments, the composition for forming a hard coating layer may further comprise a lubricant. The lubricant may further improve winding efficiency, blocking resistance, wear resistance, scratch resistance, and the like.

The type of lubricant is not particularly limited, and for example, waxes such as polyethylene wax, paraffin wax, synthetic wax, and/or montan wax; synthetic resins such as silicon-based resins and/or fluorine-based resins; and/or the like may be used, and these may be used alone or in combination of two or more, but the present disclosure is not necessarily limited thereto.

Besides, the composition for forming a hard coating layer may further comprise additives such as, for example, an antioxidant, a UV absorber, a photostabilizer, a thermal polymerization inhibitor, a leveling agent, a surfactant, a lubricant, and/or an antifouling agent.

In some embodiments, the application may be performed by a die coater, an air knife, a reverse roll, a spray, a blade, casting, gravure, spin coating and the like, but is not necessarily limited thereto.

In some embodiments, a window cover film comprising an optical multilayer structure disclosed herein is provided. In other embodiments, a flexible display panel or a flexible display device comprising a window cover film disclosed herein is provided.

Since the multilayer structure according to some embodiments may have minimized curling and high surface hardness, it may be effectively applied to the window cover film and/or the flexible display panel.

The window cover film may be used as an outermost window substrate of a flexible display device. The flexible display device may be various image display devices such as a common liquid crystal display device, an electroluminescent display device, a plasma display device, or a field emission display device.

Hereinafter, the examples and the experimental examples will be illustrated in detail. However, the examples and the experimental examples described later illustrate only a part of one implementation, and the technology described in the present specification is not construed as being limited thereto.

<Preparation Example 1> Preparation of Polyimide Precursor Composition (TFMB/TMEG-100)

An agitator in which a nitrogen stream flowed was filled with 267 g of N,N-dimethylpropionamide (DMPA), and 39 g of 2,2'-bis(trifluoromethyl)benzidine (TFMB) was dissolved while the temperature of the reactor was maintained at 25° C. 50 g of ethylene glycol bis(4-trimellitate anhydride) (TMEG-100) was added thereto at the same temperature and stirring was performed while dissolution was performed for a certain period of time. Next, propylene glycol methylether (PGME) was added so that the solid content concentration of the solution was 6 wt %, thereby preparing a polyimide precursor composition. At this time, a mole ratio between TFMB and TMEG-100 was about 1:1, and a mass ratio between DMPA and PGME was about 2:8.

<Preparation Example 2> Preparation of Polyimide Precursor Composition (6FAPB/TMEG-100)

An agitator in which a nitrogen stream flowed was filled with 230 g of DMPA, and 36.5 g of 1,4-bis(4-amino-2-trifluoromethylphenoxy)benzene (6FAPB) was dissolved therein while the temperature of the reactor was maintained at 25° C. 35 g of TMEG-100 was added at the same temperature thereto, and stirring was performed while dissolution was performed for a certain period of time. Next, propylene glycol methyl ether acetate (PGMEA) was added so that the solid content concentration of the solution was 6 wt %, thereby preparing a polyimide precursor composition. At this time, a mole ratio between 6FAPB and TMEG-100 was about 1:1, and a mass ratio between DMPA and PGME was about 2:8.

<Preparation Example 3> Preparation of Polyimide Precursor Composition (6FODA/TMEG-100)

An agitator in which a nitrogen stream flowed was filled with 153 g of DMPA, and 41 g of 2,2'-bis(trifluoromethyl)-4,4'-diaminodiphenyl ether (6FODA) was dissolved therein while the temperature of a reactor was maintained at 25° C. 50 g of TMEG-100 was added at the same temperature thereto, and stirring was performed while dissolution was performed for a certain period of time. Next, PGMEA was added so that the solid content concentration of the solution was 6 wt %, thereby preparing a polyimide precursor composition. At this time, a mole ratio between 6FODA and TMEG-100 was about 1:1, and a mass ratio between DMPA and PGME was about 2:8.

<Preparation Example 4> Preparation of Polyimide Precursor Composition (6FODA/TPER/TMEG-100)

An agitator in which a nitrogen stream flowed was filled with 238 g of DMPA, 18.4 g of 6FODA and 16 g of 1,3-bis(4-aminophenoxy)benzene (TPER) were added at the same temperature while the temperature of the reactor was maintained at 25° C. stirring, and stirring was performed while dissolution was performed for a certain period of time. 45 g of TMEG-100 was added at the same temperature thereto, and stirring was performed while dissolution was performed for a certain period of time. Next, PGMEA was added so that the solid content concentration of the solution was 6 wt %, thereby preparing a polyimide precursor composition. At this time, a mole ratio of 6FODA, TPER, and TMEG-100 was about 0.5:0.5:1, and a mass ratio between DMPA and PGME was about 2:8.

<Preparation Example 5> Preparation of Polyimide Precursor Composition (TFMB/DMS-DPS/TMEG-100)

An agitator in which a nitrogen stream flowed was filled with 248 g of a mixed solvent of DMPA and PGME at a mass ratio of 8:2, 24.5 g of TFMB and 40.7 g of dimethylsiloxane-diphenylsiloxane (DMS-DPS) oligomer diamine compound (Shin-etsu, X-22-1660B-3, molecular weight: 4,400 g/mol) were added thereto while the temperature of the reactor was maintained at 25° C., and dissolution was performed. 36 g of TMEG-100 was added thereto, and stirring was performed while dissolution was performed at 50° C. for 8 hours and at room temperature for 24 hours. Next, PGMEA was further added so that the solid content concentration was 6 wt %, thereby preparing a polyimide precursor composition. At this time, DMS-DPS was about 40 wt % based on the total mass of the monomer, a mole ratio of TFMB and DMS-DPS to TMEG-100 was 0.99:1, and a mass ratio between DMPA and PGME was about 2:8.

<Preparation Example 6> Preparation of Polyimide Precursor Composition (TFMB/DMS-DPS/TMEG-100)

An agitator in which a nitrogen stream flowed was filled with 248 g of a mixed solvent of DMPA and PGME at a mass ratio of 8:2, 24.5 g of TFMB and 40.7 g of dimethylsiloxane-diphenylsiloxane (DMS-DPS) oligomer diamine compound (Shin-etsu, X-22-1660B-3, molecular weight: 4,400 g/mol) were added thereto while the temperature of the reactor was maintained at 25° C., and dissolution was performed. 36 g of TMEG-100 was added thereto, and stirring was performed while dissolution was performed at 50° C. for 8 hours and at room temperature for 24 hours. Next, a mixed solvent of DMPA and PGME at a mass ratio of 8:2 was further added so that the solid content concentration was 25 wt %, thereby preparing a polyimide precursor composition. At this time, DMS-DPS was about 40 wt % based on the total mass of the monomer, and a mole ratio of TFMB and DMS-DPS to TMEG-100 was about 0.99:1.

<Preparation Example 7> Preparation of Polyimide Precursor Composition (TFMB/DMS-DPS/TMEG-100)

A polyimide precursor composition having a solid content concentration of 25 wt % was prepared in the same manner as in Preparation Example 6, except that about 45 wt % of DMS-DPS was used based on the total mass of the monomer.

<Preparation Example 8> Preparation of Polyimide Precursor Composition (TFMB/DMS-DPS/TMEG-100)

A polyimide precursor composition having a solid content concentration of 25 wt % was prepared in the same manner as in Preparation Example 6, except that about 50 wt % of DMS-DPS was used based on the total mass of the monomer.

Preparation Example 9

KBM-403 (Shin-etsu, 3-glycidoxypropyl trimethoxysilane) as a silane coupling agent was prepared.

<Preparation Example 10> Preparation of Composition for Forming Hard Coating Layer 2-(3,4-Epoxycyclohexyl)ethyltrimethoxysilane (ECTMS, available from TCI) and water were mixed at a ratio of 24.64 g:2.70 g (0.1 mol:0.15 mol) to prepare a mixture, which was added to a 250 mL 2-neck flask. To the mixture, 0.1 mL of tetramethylammoniumhydroxide (TMAH, available from Aldrich) as a catalyst and 100 mL of tetrahydrofuran (THF, available from Aldrich) were added, and stirring was performed at 25° C. for 36 hours. Thereafter, layer separation was performed, a product layer was extracted with methylene chloride (Aldrich), moisture was removed from the extract with $MgSO_4$, and the solvent was dried under vacuum to obtain an epoxy siloxane-based resin.

30 g of the epoxy siloxane-based resin prepared as described above, 10 g of (3',4'-epoxycyclohexyl)methyl 3,4-epoxycyclohexanecarboxylate and 5 g of bis[(3,4-epoxycyclohexyl)methyl] adipate as a crosslinking agent, 0.5 g of (4-methylphenyl) [4-(2-methylpropyl)phenyl]iodoniumhexafluorophosphate as a photoinitiator, and 54.5 g of methyl ethyl ketone were mixed to prepare a composition for forming a hard coating layer.

Examples 1 to 10 and Comparative Examples 1 to 3

In order to manufacture the optical multilayer structure of Example 1, the polyimide precursor composition prepared in Preparation Example 1 was applied on one surface of a glass substrate (UTG, 30 µm) using a #6 Mayer bar, and was dried at 80° C. for 10 minutes to form an adhesion promoting layer having a thickness of 500 nm. Next, the polyimide precursor composition prepared in Preparation Example 6 was applied on the adhesion promoting layer formed using a #30 Mayer bar, dried at 80° C. for 10 minutes in a nitrogen atmosphere, and then cured at 230° C. for 15 minutes to form a shatterproof layer having a thickness of 10 µm. Next, the composition for a hard coating layer prepared in Preparation Example 10 was applied on the shatterproof layer formed using a #10 Mayer bar, and dried at 60° C. for 3 minutes. Thereafter, it was irradiated with ultraviolet rays at 1 J/cm² using a high pressure metal lamp, and dried at 150° C. for 10 minutes to form a hard coating layer having a thickness of 10 µm, thereby manufacturing the optical multilayer structure of Example 1.

Also, the glass substrate and the polyimide composition of each layer shown in the following Table 2 were used to manufacture the optical multilayer structures of Examples 2 to 10 and Comparative Examples 1 to 3. At this time, in Comparative Examples 1 and 2, the manufacture was performed without the step of forming an adhesion promoting layer.

TABLE 2

|  | Thickness of glass substrate | Composition of hard coating layer (thickness) | Composition of shatterproof layer (thickness) | Composition of adhesion promoting layer (thickness) |
| --- | --- | --- | --- | --- |
| Example 1 | 30 um | Preparation Example 10 (10 µm) | Preparation Example 6 (10 µm) | Preparation Example 1 (500 nm) |
| Example 2 | 30 um | Preparation Example 10 (10 µm) | Preparation Example 6 (10 µm) | Preparation Example 2 (500 nm) |
| Example 3 | 30 um | Preparation Example 10 (10 µm) | Preparation Example 6 (10 µm) | Preparation Example 3 (500 nm) |
| Example 4 | 30 um | Preparation Example 10 (10 µm) | Preparation Example 6 (10 µm) | Preparation Example 4 (500 nm) |
| Example 5 | 30 um | Preparation Example 10 (10 µm) | Preparation Example 6 (10 µm) | Preparation Example 5 (500 nm) |
| Example 6 | 30 um | Preparation Example 10 (10 µm) | Preparation Example 7 (10 µm) | Preparation Example 1 (500 nm) |
| Example 7 | 30 um | Preparation Example 10 (10 µm) | Preparation Example 8 (10 µm) | Preparation Example 1 (500 nm) |
| Example 8 | 30 um | Preparation Example 10 (10 µm) | Preparation Example 6 (10 µm) | Preparation Example 1 (700 nm) |
| Example 9 | 70 um | Preparation Example 10 (10 µm) | Preparation Example 6 (10 µm) | Preparation Example 1 (3 µm) |
| Example 10 | 100 um | Preparation Example 10 (10 µm) | Preparation Example 6 (10 µm) | Preparation Example 1 (4 µm) |
| Comparative Example 1 | 30 um | Preparation Example 10 (10 µm) | Preparation Example 6 (10 µm) | — |

TABLE 2-continued

|  | Thickness of glass substrate | Composition of hard coating layer (thickness) | Composition of shatterproof layer (thickness) | Composition of adhesion promoting layer (thickness) |
|---|---|---|---|---|
| Comparative Example 2 | 30 um | Preparation Example 10 (10 µm) | Preparation Example 8 (10 µm) | — |
| Comparative Example 3 | 30 um | Preparation Example 10 (10 µm) | Preparation Example 6 (10 µm) | Preparation Example 9 (200 nm) |

Experimental Example

The optical multilayer structures manufactured in the examples and the comparative examples were used to measure the physical properties of the substrate by the following methods, and the results are shown in the following Table 3.

1. Measurement of Shattering Resistance

Evaluation was performed at room temperature using a ball drop measuring instrument from Nano Hitec. The optical multilayer structures manufactured in the examples and the comparative Examples were placed on a sample support, a steel ball having a weight of 130 g and a diameter of 30 mm was dropped from a height of 1 m, and then the state of the optical multilayer structures was visually evaluated according to the following criteria:
◎: No nicks and pressing
○: Nicks and pressing present
×: Broken (debris shattered)

2. Adhesiveness Test (Cross-Cut Test)

A cross-cut test method was used to evaluate adhesiveness. The optical multilayer structures manufactured in the examples and the comparative examples were cut into 100 square shapes having a size of 1 mm×1 mm, a glass tape was attached to and detached from a specimen, and the number of fallen fragments was measured to evaluate adhesion and indicated as (number of fallen fragments/100).

3. Folding Property Test

The test was performed for 200,000 repetitions at a curvature radius of about 1.5 R to 5.0 R (in a curvature radius condition of about 1.5 R in Examples 1 to 8 and Comparative Examples 1 to 3, and in a curvature radius condition of 5.0 R in Examples 9 and 10) and a test speed of 30 r/min, using a folding tester (Yuasa system, DMX-FS-A), and when the test was finished, the folding properties were evaluated depending on whether the optical multilayer structure was broken.
OK: No break
NG: Broken 4. Measurement of Haze A haze (%) value was measured using a spectrophotometer (from Nippon Denshoku, COH-5500) in accordance with the ASTM D1003 standard.

5. Measurement of Total Light Transmittance (T.T)

A total light transmittance was measured in the entire wavelength region of 400 nm to 700 nm, using a spectrophotometer (Nippon Denshoku, COH-400), in accordance with the ASTM D1746 standard.

6. Surface Hardness Measurement

A load of a weight of 750 g was applied and a pencil hardness was measured, using a pencil hardness tester (available from Ocean Science, COAD.607). An angle between the pencil and the optical multilayer structures manufactured in the examples and the comparative examples was set at 45°, the measurement was performed three times at 10 mm intervals at a speed of 20 mm/min, and when there were two or more scratches, it was determined to be defective, and the surface hardness was indicated as the hardness before defects occurred.

7. Measurement of Substrate Bending (Curling)

A curling degree (curl amount) of both ends of the optical multilayer structure from the ground was measured using a ruler, and the curl amount (mm) was calculated as an average value of the values measured at both ends.

TABLE 3

|  | Shattering resistance | Adhesiveness | Folding properties | Haze (%) | Light transmittance (%) | Surface hardness | Curl amount (mm) |
|---|---|---|---|---|---|---|---|
| Example 1 | ◎ | 0/100 | OK | 0.1 | 92 | 3H | 0.5 |
| Example 2 | ◎ | 0/100 | OK | 0.1 | 93 | 3H | 0.4 |
| Example 3 | ◎ | 0/100 | OK | 0.1 | 92 | 3H | 0.5 |
| Example 4 | ◎ | 0/100 | OK | 0.1 | 91 | 3H | 0.4 |
| Example 5 | ◎ | 0/100 | OK | 0.1 | 92 | 3H | 0.4 |
| Example 6 | ◎ | 0/100 | OK | 0.1 | 92 | 3H | 0.3 |
| Example 7 | ◎ | 0/100 | OK | 0.1 | 92 | 3H | 0.1 |
| Example 8 | ◎ | 0/100 | OK | 0.1 | 92 | 3H | 0.6 |
| Example 9 | ◎ | 0/100 | OK | 0.1 | 92 | 3H | 0.1 |
| Example 10 | ◎ | 0/100 | OK | 0.1 | 92 | 3H | 0.1 |
| Comparative Example 1 | X | 80/100 | NG | 0.1 | 92 | 4B | 0.5 |
| Comparative Example 2 | X | 75/100 | NG | 0.1 | 92 | 3B | 0.1 |
| Comparative Example 3 | X | 0/100 | NG | 0.1 | 92 | 4B | 0.2 |

As confirmed from Table 3, the optical multilayer structures according to the Examples had excellent interlayer adhesiveness, had minimized curling while having high surface hardness, and implemented excellent shattering resistance and low haze, as compared with the Comparative Examples. Specifically, the optical multilayer structure according to the Examples had excellently improved shattering resistance, adhesiveness, folding properties, and surface hardness as compared with Comparative Examples 1 and 2 which did not comprise the adhesion promoting layer, and had excellently improved shattering resistance, folding properties, and surface hardness as compared with Comparative Example 3 which used a commercialized silane coupling agent in the adhesion promoting layer. Meanwhile, the optical multilayer structures of Comparative Examples 1 to 3 had improved curling by introducing the compound comprising a siloxane structure to the shatterproof layer, but in the ball drop test, since the specimen was broken and debris was shattered, the shattering resistance was not implemented excellently, and since the surface hardness was low, 3B or less, the physical properties were poor.

The present disclosure relates to an optical multilayer structure comprising a shatterproof layer comprising a polyimide resin comprising a siloxane structure and an adhesion promoting layer, and since the adhesion promoting layer and the shatterproof layer of the optical multilayer structure according to some embodiments are connected by a chemical bond (imide bond), interlayer adhesiveness is high and durability is excellent. Also, the optical multilayer structure according to one implementation has excellent heat resistance, so that curling is reduced to minimize substrate bending, has high surface hardness, so that mechanical properties are excellent, and/or has a low haze and is transparent, so that optical properties are excellent.

Hereinabove, though an exemplary embodiment has been described in detail by the preferred examples and experimental examples, the range of the embodiment is not limited to specific examples, and should be construed by the appended claims.

The invention claimed is:

1. An optical multilayer structure comprising:
a substrate;
an adhesion promoting layer which is formed on any one or both surfaces of the substrate, the adhesion promoting layer being prepared from a composition comprising a polyimide resin; and
a shatterproof layer which is formed on the adhesion promoting layer, the shatterproof layer being prepared from a composition comprising a polyimide resin comprising a structural unit represented by the following Chemical Formula 1,
wherein the adhesion promoting layer and the shatterproof layer are connected by an imide bond:

[Chemical Formula 1]

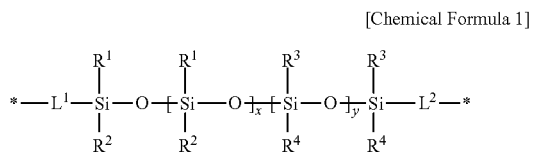

wherein
R1 and R2 are independently of each other C1-5 alkyl which is unsubstituted or substituted with one or more halogens;
R3 and R4 are independently of each other C6-10 aryl which is unsubstituted or substituted with one or more halogens;

L1 and L2 are independently of each other C1-10 alkylene; and
x and y are independently of each other an integer of 1 or more.

2. The optical multilayer structure of claim 1, wherein
R1 and R2 are independently of each other C1-3 alkyl which is unsubstituted or substituted with one or more halogens;
R3 and R4 are independently of each other C6-8 aryl which is unsubstituted or substituted with one or more halogens; and
L1 and L2 are independently of each other C1-5 alkylene.

3. The optical multilayer structure of claim 1, wherein the structure of Chemical Formula 1 is a structure of the following Chemical Formula 2:

[Chemical Formula 2]

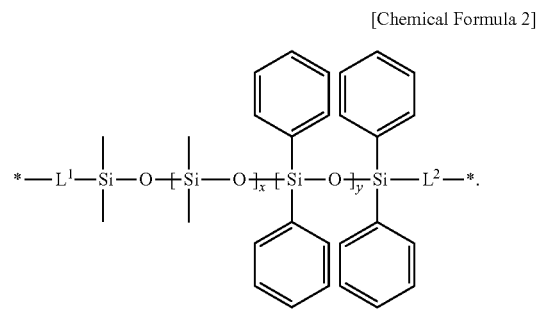

wherein
L1 and L2 are independently of each other C1-10 alkylene; and
x and y are independently of each other an integer of 1 or more.

4. The optical multilayer structure of claim 1, further comprising: a hard coating layer on the shatterproof layer.

5. The optical multilayer structure of claim 1, wherein when the adhesion promoting layer is formed on any one surface of the substrate, the optical multilayer structure further comprises a hard coating layer formed on the other surface of the substrate on which the adhesion promoting layer is not formed.

6. The optical multilayer structure of claim 4, wherein the hard coating layer comprises a compound comprising an epoxy group or an acrylic resin.

7. The optical multilayer structure of claim 5, wherein the hard coating layer comprises a compound comprising an epoxy group or an acrylic resin.

8. The optical multilayer structure of claim 1, wherein the polyimide resin comprised in the composition for preparing the adhesion promoting layer further comprises a unit derived from an aromatic diamine.

9. The optical multilayer structure of claim 1, wherein the optical multilayer structure has a haze of 1.0% or less as measured in accordance with the ASTM D1003 standard.

10. The optical multilayer structure of claim 1, wherein the polyimide resin comprised in the composition for preparing the adhesion promoting layer and/or the composition for preparing the shatterproof layer comprises a unit derived from a diamine represented by the following Chemical Formula 3:

[Chemical Formula 3]

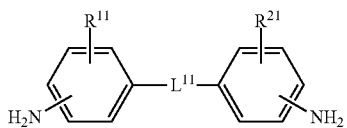

wherein
R11 and R21 are independently of each other hydrogen or a C1-20 monovalent organic group;
L11 is —SO2—, —O—, or —C(=O)O—, or a C1-20 divalent organic group comprising any one or more of —SO2—, —O—, or —C(=O)O—; and
Chemical Formula 3 does not comprise a fluorine atom.

11. The optical multilayer structure of claim 10, wherein R11 and R21 are independently of each other hydrogen or a C1-10 monovalent organic group; and
L11 is —SO2—, —O—, or —C(=O)O—, or a C1-15 divalent organic group comprising any one or more of —SO2—, —O—, or —C(=O)O—.

12. The optical multilayer structure of claim 10, wherein L11 is —SO2—, —O—, or —C(=O)O—, or is a combination of any one or more of —SO2—, —O—, or —C(=O)O— and any one or more selected from the group consisting of C1-10 alkyl, C5-18 cycloalkylene, and C6-18 arylene.

13. The optical multilayer structure of claim 1, wherein the polyimide resin comprised in the composition for preparing the adhesion promoting layer and/or the composition for preparing the shatterproof layer comprises a unit derived from a fluorine-based diamine.

14. The optical multilayer structure of claim 13, wherein the fluorine- based diamine comprises one or more selected from the group consisting of 2,2'-bis(trifluoromethyl)benzidine (TFMB), 2,2-bis[4-(4-aminophenoxy)phenyl]hexafluoropropane (HFBAPP), 2,2-bis(4-aminophenyl)hexafluoropropane (BAHF), 2,2'-bis(trifluoromethyl)-4,4'-diaminodiphenylether (6FODA), 4,4'-bis(4-amino-2-trifluoromethylphenoxy)biphenyl, 1,4-bis(4-amino-2-trifluoromethylphenoxy)benzene (6FAPB), and mixtures thereof.

15. The optical multilayer structure of claim 1, wherein the substrate is an ultrathin glass (UTG) substrate.

16. A method for manufacturing the optical multilayer structure according to claim 1, the method comprising:
applying a polyimide precursor composition on any one or both surfaces of the substrate and drying the composition to form the adhesion promoting layer; and
applying a polyimide precursor composition comprising the structural unit represented by Chemical Formula 1 and curing the composition to form the shatterproof layer:

[Chemical Formula 1]

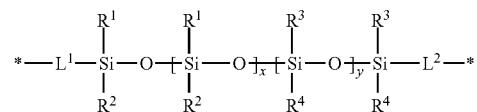

wherein
R1 and R2 are independently of each other C1-5 alkyl which is unsubstituted or substituted with one or more halogens;
R3 and R4 are independently of each other C6-10 aryl which is unsubstituted or substituted with one or more halogens;
L1 and L2 are independently of each other C1-10 alkylene; and
x and y are independently of each other an integer of 1 or more.

17. The method for manufacturing the optical multilayer structure of claim 16, further comprising:
applying a composition for forming a hard coating layer on the shatterproof layer and curing the composition to form a hard coating layer.

18. The method for manufacturing the optical multilayer structure of claim 16, further comprising:
when the adhesion promoting layer is formed on any one surface of the substrate,
applying a composition for a hard coating layer on the other surface of the substrate on which the adhesion promoting layer is not formed and curing the composition to form a hard coating layer.

19. A window cover film comprising the optical multilayer structure according to claim 1.

20. A flexible display panel comprising the window cover film according to claim 19.

* * * * *